United States Patent [19]

Gallivan

[11] Patent Number: 5,408,100
[45] Date of Patent: Apr. 18, 1995

[54] CHROMATIC RADIANCE ATTENUATOR
[75] Inventor: James R. Gallivan, Pomona, Calif.
[73] Assignee: Hughes Missile Systems Company, Los Angeles, Calif.
[21] Appl. No.: 74,691
[22] Filed: Jun. 10, 1993

Related U.S. Application Data

[63] Continuation of Ser. No. 812,934, Dec. 24, 1991, abandoned.
[51] Int. Cl.6 .............................. G01J 1/42; G01J 5/06
[52] U.S. Cl. .................................... 250/352; 250/332; 250/353
[58] Field of Search ............ 250/353, 352, 332, 370.15

[56] References Cited

U.S. PATENT DOCUMENTS

| | | | |
|---|---|---|---|
| 3,363,962 | 1/1968 | Vogl | 250/353 |
| 4,507,551 | 3/1985 | Howard et al. | 250/353 |
| 4,783,593 | 11/1988 | Noble | 250/332 |
| 4,827,130 | 5/1989 | Reno | 250/353 |
| 4,937,450 | 6/1990 | Wakabayashi et al. | 250/353 |
| 5,075,553 | 12/1991 | Noble et al. | 250/352 |
| 5,153,436 | 10/1992 | Apperson et al. | 250/352 |

FOREIGN PATENT DOCUMENTS

| | | | |
|---|---|---|---|
| 63-61123 | 3/1988 | Japan | 250/352 |
| 63-243820 | 10/1988 | Japan | 250/352 |

Primary Examiner—Paul M. Dzierzynski
Assistant Examiner—Drew A. Dunn
Attorney, Agent, or Firm—Charles D. Brown; Randall M. Heald; Wanda K. Denson-Low

[57] ABSTRACT

An apparatus for decreasing stray radiation incident upon an infrared detector includes a concavely curved lens surface adjacent the detector, the center of curvature of which concave surface is located on the surface of the detector. This arrangement limits stray radiation originating rearward of the concave lens surface to black-body radiation emitted forward from the surface on which the detector is mounted, and the detector itself. That stray radiation may be reduced to a low value by decreasing the temperature and/or increasing the emissivity of the detector mounting surface and the detector itself. Stray radiation out of a desired wavelength band and originating forward of the rear concave lens surface may be attenuated by means of a spectrally selective filter. In a preferred embodiment, the spectrally selective filter comprises a multi-layer dielectric coating on the concave rear lens surface, the coating having high transmissivity for in-band radiation and high reflectivity for out-of-band radiation, thereby reflecting out-of-band radiation forward, away from the detector.

20 Claims, 3 Drawing Sheets

CHROMATIC RADIANCE ATTENUATOR

This is a continuation of application Ser. No. 07/812,934, filed Dec. 24, 1991, now abandoned.

BACKGROUND OF THE INVENTION

A. Field of the Invention

The present invention relates to radiation detection apparatus. More particularly, the invention relates to an apparatus for reducing unwanted infrared radiation from irradiating the detector elements of infrared detection systems, thereby improving the operational performance of such systems.

B. Description of Background Art

The human eye is responsive to electromagnetic radiation in the approximate wavelength range of about 0.4 micrometer (microns) to about 0.75 micron, that wavelength range being referred to as light. Light at the lower and upper ends of the visible spectrum appear violet and deep red, respectively. Hence, electromagnetic radiation in a band of wavelengths ranging from slightly above 0.75 micron to 300 or more microns is referred to as "Infrared" radiation, while electromagnetic radiation in the wavelength range below 0.4 micron to 0.01 micron or less is referred to as "Ultraviolet" radiation.

Detection of infrared radiation serves a wide variety of consumer, industrial, military and other governmental purposes. For example, satellites routinely use infrared detectors to generate images of the earth in infrared wavelengths. Information relative to weather, crop conditions, pollution and mineral deposits can be gleaned from these images.

According to Planck's law, the energy of a photon is given by the product of Planck's constant times the vibration frequency of the photon. The latter frequency is inversely proportional to the wavelength of the photon. Therefore, the energy of an individual photon, called the quantum energy, is less for photons in infrared wavelength regions than for photons in the visible spectrum. For example, a photon in the near infrared wavelength region having a wavelength of 1 micron has one-half the energy of a photon in the middle of the visible spectrum, the latter having a wavelength of 0.5 micron. And, a photon in the "middle" infrared region having a wavelength of 10 microns has a quantum energy one-twentieth that of a 0.5 micron photon.

Many infrared observations are made in the 1-micron to 14-micron wavelength range. This is because many phenomena of interest result in the emission of substantial quantities of infrared energy in this wavelength region. Moreover, there are various "windows," i.e., wavelength regions of relatively high transparency in the atmosphere, in the 1-micron to 14-micron wavelength range.

Operation of infrared detectors, especially in the longer wavelength regions near 10 microns, poses certain problems. First, the low quantum energy of long-wavelength photons, as described above, necessitates rather special detector materials that are sufficiently transparent and responsive to such low energy photons. Typical long-wave detector materials must be cooled to a substantially low temperature to achieve adequate sensitivity, and to reduce thermal noise that is inherent in any detector, to an acceptably low level.

Infrared detectors are often cooled in a device called a dewar. A typical dewar consists of a pair of concentric cylinders; an outer cylinder having a circular window at one end thereof, and an inner cylinder of smaller diameter having an end wall or "cold finger" spaced inwards from the window. Infrared detector elements are mounted on the cold finger. The ends of the two dewar cylinders opposite the window and cold finger are joined together in an annular ring-shaped transition section, thereby forming an elongated annular space between the inner and outer cylinders. This space is evacuated to create a vacuum in the enclosed space between the inner and outer cylinders. Cooling gas or fluid is introduced into the open end of the smaller inner cylinder, thereby cooling the smaller cylinder and attached infrared detector. Conduction of heat between inner and outer cylinders is minimized by maintaining a vacuum between the two cylinders, thereby reducing to a reasonable value the thermal capacity of cooling fluid required to maintain the detector at a particular temperature below ambient.

Another problem associated with operation of infrared detectors at longer wavelengths arises from the inherent nature of infrared radiation. Every object that is at a temperature exceeding that of absolute zero ($-273°$ C.) emits electromagnetic radiation at a rate proportional to the 4th power of the temperature, in accordance with the well-known Stefan-Boltzman law. The wavelength of peak emission of this inherent, "black-body" radiation, is inversely proportional to the temperature, in accordance with Wien displacement law. Thus, the sun, which has a surface temperature of about 6,000 Kelvin ($K = °C. + 273°$) has a peak emission at a wavelength of about 0.56 micron (yellow). On the other hand, an object at "room" temperature ($27°$ C. or 300 K) has a peak black-body emission at a wavelength of about 10 microns.

In many applications, infrared detectors are used to view objects in a scene in which the background surrounding the object, as well as the object itself, in some instances, is at a temperature near 300 K. Thus, it can be readily understood that black-body radiation from the background may interfere with proper operation of the infrared detector in such applications. Accordingly, it is frequently desirable to limit the field of view of an infrared detector, so as to reduce the amount of radiation received by the detector from the background. This reduction in field of view may be achieved by the interposition of a diaphragm plate or aperture stop plate in the optical path between an object viewed and the detector, and/or by surrounding the detector with a baffling arrangement. However, interposition of an aperture plate or baffles in an infrared optical system presents other problems. Since such aperture plates or baffles are often at "room" temperature, i.e., near 300 K, a substantial quantity of black-body infrared radiation may be emitted by these elements towards the infrared detector. This flux of extraneous infrared radiation can increase the electrical noise in the electrical output signals from the infrared detector, thereby decreasing the overall sensitivity and signal-to-noise ratio of the system employing the infrared detector.

In principle, baffles or aperture plates used in an infrared optical system could be thermally coupled to a cooling source used to cool the infrared detector. Thus, some cooled infrared detector systems employ baffles or extraneous radiation-blocking shields incorporated into or attached to the inner cylinder of a dewar. However, cooling other elements in addition to the detector elements in an infrared optical system is oftentimes impractical. Thus, cooling additional elements may require more coolant than is available, in a satellite, for example. Also, thermally insulating baffles and aperture plates, and conducting cooling fluid to them, is often problematical. Therefore, other solutions to the problem of reducing background radiation incident upon an infrared detector have been proposed. Examples of such solutions are contained in the following United States patents:

Gibson, U.S. Pat. No. 2,544,261, Mar. 6, 1951, Infrared Sensitive Cell

Discloses an infrared detector cell having an outer tubular shell and a cooled inner coaxial tubular shell connected thereto forming a closed elongated annular space therebetween, the inner shell having a transverse end spaced longitudinally inwards from the circular end of the large tube containing an infrared window. A detector is mounted in the transverse end of the smaller, inner tube. A mirror surface is applied to the inner surface of the large tube adjacent the detector, to minimize radiation therefrom towards the detector. An indentation for the detector, or a raised annular boss or shield is formed in the end of the inner tube to support the detector to further limit unwanted radiation from reaching the detector.

Jungkman, et al., U.S. Pat. No. 4,914,299, Apr. 3, 1990, Glass Cold Shield

Discloses a shield for a linear array of infrared detectors comprising parallel, longitudinally disposed, infrared-absorbing glass bars.

Wakabayashi, et al., U.S. Pat. No. 4,937,450, Jun. 26, 1990, Infrared Detector Comprising An Evacuated And Cooled Dewar Having An Elliptical Spheroid End Window Discloses an evacuated and cooled dewar of an infrared detector that has a window end in the shape of an elliptical spheroid, and an IR detection element mounted within the focal circle of the elliptical spheroid. The construction minimizes the sensing of spurious IR rays by the detection element, as well as the heat load for the coolant and the cool-down time.

Japanese Patent, 63-208728, Sep. 30, 1988, Higuchi

Discloses a filter for an infrared detector mounted in a vacuum dewar having a window. The filter comprises a parallel plate having an absorbing thin filter obtained by forming a vapor-deposited optical material which is non-transmissive to out-of-band wavelengths.

The present invention was conceived of to provide versatile means for minimizing unwanted radiant energy from impinging upon an infrared detector, in which certain limitations of prior art techniques are overcome.

OBJECTS OF THE INVENTION

An object of the present invention is to provide means for minimizing the amount of extraneous radiant energy incident upon an infrared detector from sources other than objects desired to be viewed by the detector, thereby improving the signal-to-noise ratio of output signals produced by the detector and improving the overall performance of an infrared detection system employing the detector.

Another object of the invention is to provide means for decreasing radiant energy, incident upon a detector, which is out of a desired band of wavelengths which the detector is intended to accept.

Another object of the invention is to provide means external to a cooling dewar of an infrared detector to decrease out-of-band radiation incident upon the detector.

Another object of the invention is to provide means for decreasing out-of-band radiation incident upon an infrared detector that is relatively simple and inexpensive to fabricate.

Another object of the invention is to provide an infrared optical system in which at least one surface of a lens in the optical system is provided with a coating which is substantially transmissive to radiant energy in a wavelength band of interest, and substantially reflective to out-of-band radiant energy.

Another object of the invention is to provide an infrared optical system in which a lens external to a dewar window is so constructed and located as to reflect towards a detector mounted on a cold finger within the dewar only rays of radiant energy emanating from cold areas of the dewar.

Another object of the invention is to provide an optical system for a cooled infrared detector in which only rays of radiant energy emanating from areas of a cold finger adjacent an infrared detector are reflected back from the closest external lens surface onto the detector.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends novel means for decreasing the amount of unwanted, extraneous radiant energy incident upon a detector. The primary application for the invention is in infrared detector systems of the type in which a detector is mounted on a cold finger within a cooling dewar, although the invention has applicability to systems having other cooling means, and to systems having no cooling means.

According to a main aspect of the present invention, novel means for decreasing radiation lying outside a wavelength band of interest are located external to a dewar in which is mounted a cooled infrared detector. Thus, the present invention may eliminate the requirement for a cooled band-stop filter.

In one embodiment of the present invention, an optical system for focusing infrared energy on an infrared detector has a concavely curved lens as the last, i.e., nearest-the-detector, optical element (save for a dewar window, if the detector is contained within a dewar). The radius of curvature of the last lens surface is made approximately equal to the distance from the detector array to the lens. Therefore, stray radiation reflected from the rear surface of the last lens onto the detector can originate only from the mounting surface adjacent the detector array, or from the detector array itself. Both the mounting surface and detector array are kept sufficiently cool to minimize electrical "shot" noise, arising within the detector itself, to an acceptable value. Therefore, radiation reflected back upon the detector array from the last lens surface will be of low energy and long wavelength. Thus, in-band radiation which might decrease the performance of the detector is substantially reduced.

In a preferred embodiment of the present invention, the concavely curved surface of the last lens described above has formed thereon an optical filter that has a high transmissibility in a desired wavelength band ("pass band") and high reflectivity for radiation of other, "out-of-band" wavelengths. Unwanted radiation that would have come from optical components forward of the coated surface, or from the scene background, is reflected forward, thus preventing unwanted radiation from reaching the detector array. Preferably, the filter is an interference type, formed of multiple dielectric layers.

According to another aspect of the invention, the detector array is tilted slightly with respect to the optical axis of the concave lens adjacent the detector array, so that a the normal to the detector array makes a small angle with respect to the axis of the concave lens. With this arrangement, it is possible to ensure that only rays emitted from the coldest surface of a cold finger on which the detector array is mounted will be reflected backwards from the concave lens surface to impinge upon the detector. Moreover, with this arrangement, a specially fabricated area having high emissivity (and correspondingly high absorptivity and low reflectivity), and which may be cooled to a substantially low temperature, may be reflectively imaged from the concave lens surface onto the detector, thus further minimizing out-of-band radiation flux on the detector array.

In another embodiment of the invention, a beam splitter plate is positioned between a dewar window and external optics, at an angle of 45 degrees to the optical axis of the system. Desired in-band radiation travels along the optical axis of the external optics and through the beam splitter to the detector. A cooling body having a surface parallel to the optical axis is located along side the beam splitter. The cooling body is so arranged that the detector views only those out-of-band rays that are off-axis, i.e., those rays emanating from the surface of the cooling body and reflected diagonally off of the rear surface of the beam splitter towards the detector. This arrangement allows the magnitude of out-of-band radiation to be reduced to a low value.

DETAILED DESCRIPTION OF THE INVENTION

Figure 1:
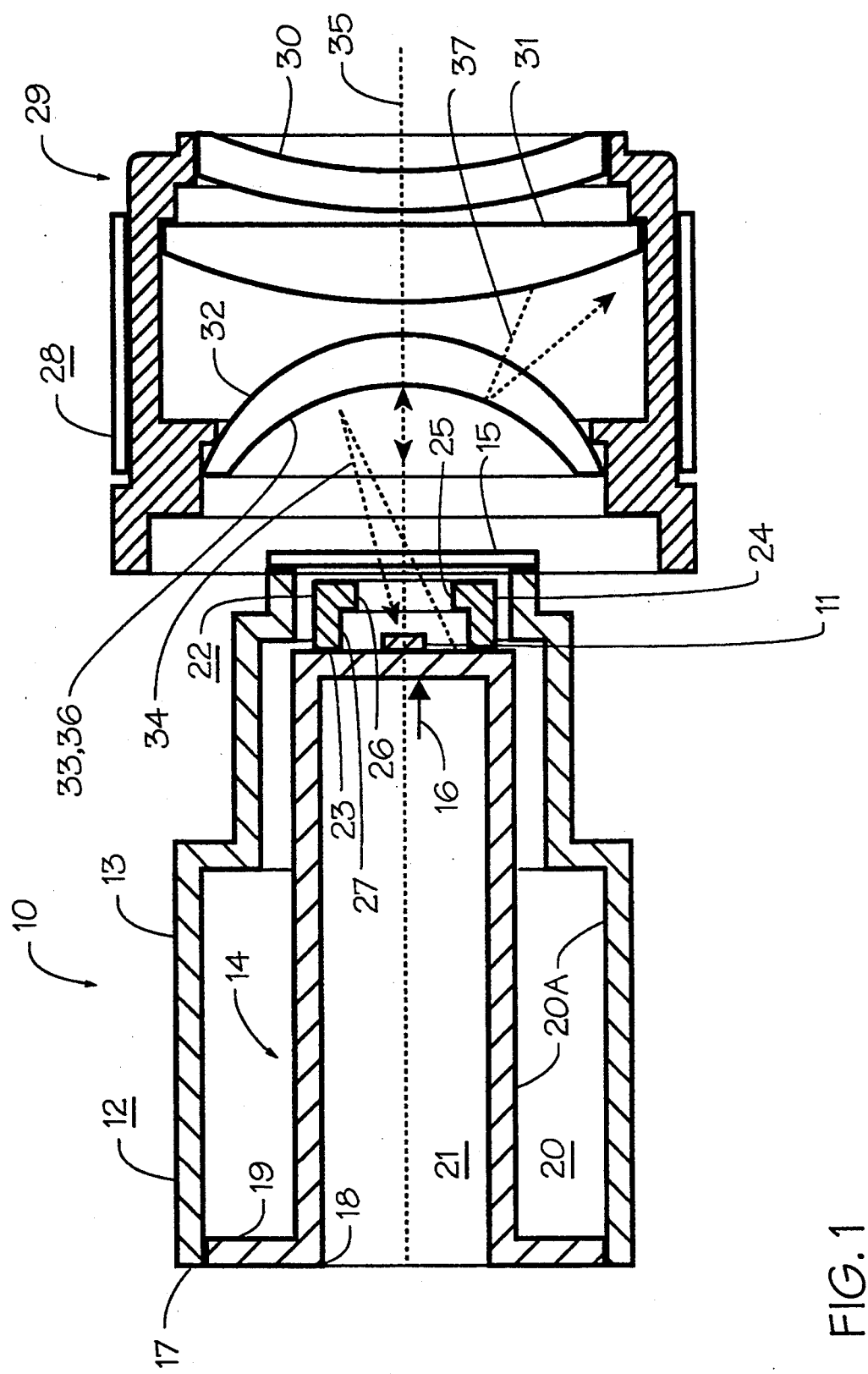
FIG. 1 is a transverse sectional view of one embodiment of a chromatic radiance attenuator according to the present invention.

Referring now to FIG. 1, a basic embodiment of the chromatic radiance attenuator according to the present invention is shown. In the embodiment 10 shown in FIG. 1, an infrared detector 11, which typically would comprise a two-dimensional array of individual detector elements, is shown contained within cooling dewar 12. However, as will be explained in greater detail below, the invention may optionally be utilized without a cooling dewar.

As shown in FIG. 1, dewar 12 includes an elongated outer cylinder 13, and a shorter cylinder 14 of smaller diameter. Cylinder 14 is located coaxially within outer cylinder 13. One transverse end of outer cylinder 13 has attached thereto a flat circular window 15 made of a material such as germanium, which is substantially transparent in a band of infrared wavelengths, which detector array 11 is sensitive to. A transverse end of inner cylinder 14 spaced longitudinally inwards from window 15 has attached thereto, or formed integrally with, a circular end wall or "cold finger" 16. Cold finger 16 is parallel to dewar window 15.

Outer cylinder 13 and inner cylinder 14 have longitudinally aligned annular end walls 17 and 18, respectively, at the ends of the cylinders opposite the window and cold finger. An annular ring 19 joins end walls 17 and 18, thus forming a longitudinally elongated annular space 20 between out cylinder 13 and inner cylinder 14. Space 20 is evacuated to create a vacuum between outer cylinder 13 and inner cylinder 14. The purpose of the vacuum is to minimize conductive heat transfer between the inner and outer cylinders. Therefore, when a cooling fluid such as liquid or gaseous nitrogen is introduced into the cylindrical interior space 21 of inner cylinder 14, cold finger 16 and attached detector array 11 are cooled by conduction between the fluid and the inner cylinder. Conductive heat loss from inner cylinder 14 to outer cylinder 13 is minimized because of the absence of any conducting material in the vacuum in space 20 between the cylinders. Radiative heat transfer between inner and outer cylinders may be minimized by applying a low emissivity coating to the inner facing surfaces 20A of the cylinders adjacent space 20.

As shown in FIG. 1, the field of view of detector array 11 may be limited to prevent unwanted radiation from impinging on detector array 11. Thus, as shown in FIG. 1, a cylindrical cold shield 22 coaxially surrounding detector array 11 is attached at its rear transverse wall 23 to cold finger 16. Cold shield 22 has at the opposite end a radially inwardly projecting annular flange 24. Flange 24 has a central coaxial aperture 25. The inner circumferential wall 26 of flange 24 surrounding aperture 25 limits the angle of rays that may reach detector array 11 through dewar window 15. The maximum conical acceptance half-angle of these rays is equal to the arctangent of the ratio of the radius of aperture 25 to the longitudinal distance between the aperture and detector array 11. Rays outside of this acceptance cone may originate from annular flange 24 and inner cylindrical wall 27 of cold shield 22. Since both of those elements are in thermal contact with cold finger 16, off-axis black body radiation emitted from the elements will be of low intensity, and have a peak emission wavelength longer than the wavelengths of interest. Thus, cold shield 22 both limits the field of view of detector array 11, and reduces the magnitude and shifts the peak emission wavelength of off-axis stray radiation which impinges upon detector array 11.

Referring again to FIG. 1, the chromatic radiance attenuator 10 according to the present invention includes a lens system 28 for focusing infrared energy emanating from an object to be viewed onto detector array 11. Lens system 28 may include a conventional "fore optics" assembly 29 comprising one or more optical elements. As shown in FIG. 1, fore optics 29 includes a first, front lens 30 and a second, intermediate lens 31, both of which are transmissive to infrared wavelengths of interest. Those skilled in the art will of course recognize that other configurations of optical elements, including reflective elements, could be used to focus infrared energy onto detector array 11.

The embodiment 10 of the present invention shown in FIG. 1 includes a rear lens 32 located between fore optics 29 and dewar window 15. Rear lens 32 has a concave rear surface 33, the radius of curvature of which surface is made approximately equal to the axial distance between that surface and detector array 11.

With lens 32 contoured and positioned relative to detector array 11 as described above, the detector array is constrained to "see" only that out-of-band radiation, originating rearward of rear lens surface 33, emitted by dewar window 15, cold finger 16, or the detector array itself. Radiation emitted by dewar window 15 is typically of very low intensity. This is due to the fact that the window is small and thin, and is made of a low absorption and low-emissivity material. Also, dewar window 15 may be coated with an anti-reflection coating that further decreases its emissivity. Moreover, some radiative and conductive cooling of window 15 occurs inherently because of its close proximity to cold finger 16. Thus, in a typical dewar system, window 15 will be at a temperature several degrees centigrade cooler than optical elements external to the dewar.

As was mentioned above, detector array 11 "sees" only out-of-band radiation emitted from cold finger 16, the radiation cold shield 22, or from the detector array itself, owing to the configuration and position of rear lens 32. Thus, as shown in FIG. 1, a typical ray 34 of black-body infrared radiation emitted from cold finger 16 is reflected rearward off rear surface 33 of rear lens 32, back onto detector array 11. Cold finger 16 is typically maintained at a substantially low temperature, in the 78 K to 90 K region, for example, using nitrogen or argon gas as a cooling fluid. Thus, radiant energy emitted from cold finger 16 and typified by ray 34 is of low intensity and long-wavelength. Also, black-body radiation emitted by detector array 11, as typified by ray 35, is reflected back off rear surface 33 of near lens 32 onto the detector array. This energy is also of low intensity and long-wavelength, since detector array 11 is cooled to a substantially low temperature as a result of being mounted on cold finger 16. Those skilled in the art will recognize that the inventive concepts disclosed above could be employed in optical systems different from that shown in FIG. 1, using reflective rather than transmissive optics for lens 32.

The embodiment of chromatic radiance attenuator 10 according to the present invention and shown in FIG. 1, also includes means for attenuating out-of-band radiation originating forward of rear lens 32. Thus, as shown in FIG. 1, rear surface 33 of rear lens 32 has formed thereon a spectral filter 36 that has high transmissivity in a desired band of infrared wavelengths, and high reflectivity for other, out-of-band wavelengths. Accordingly, unwanted out-of-band radiation that might originate from components forward of rear lens surface 33, or from the background of an object being viewed, is reflected forward. Ray 37 typifies such forward-reflected, out-of-band radiation. This forward reflection further substantially reduces the amount of out-of-band radiation impinging upon detector array 11.

Figure 2:
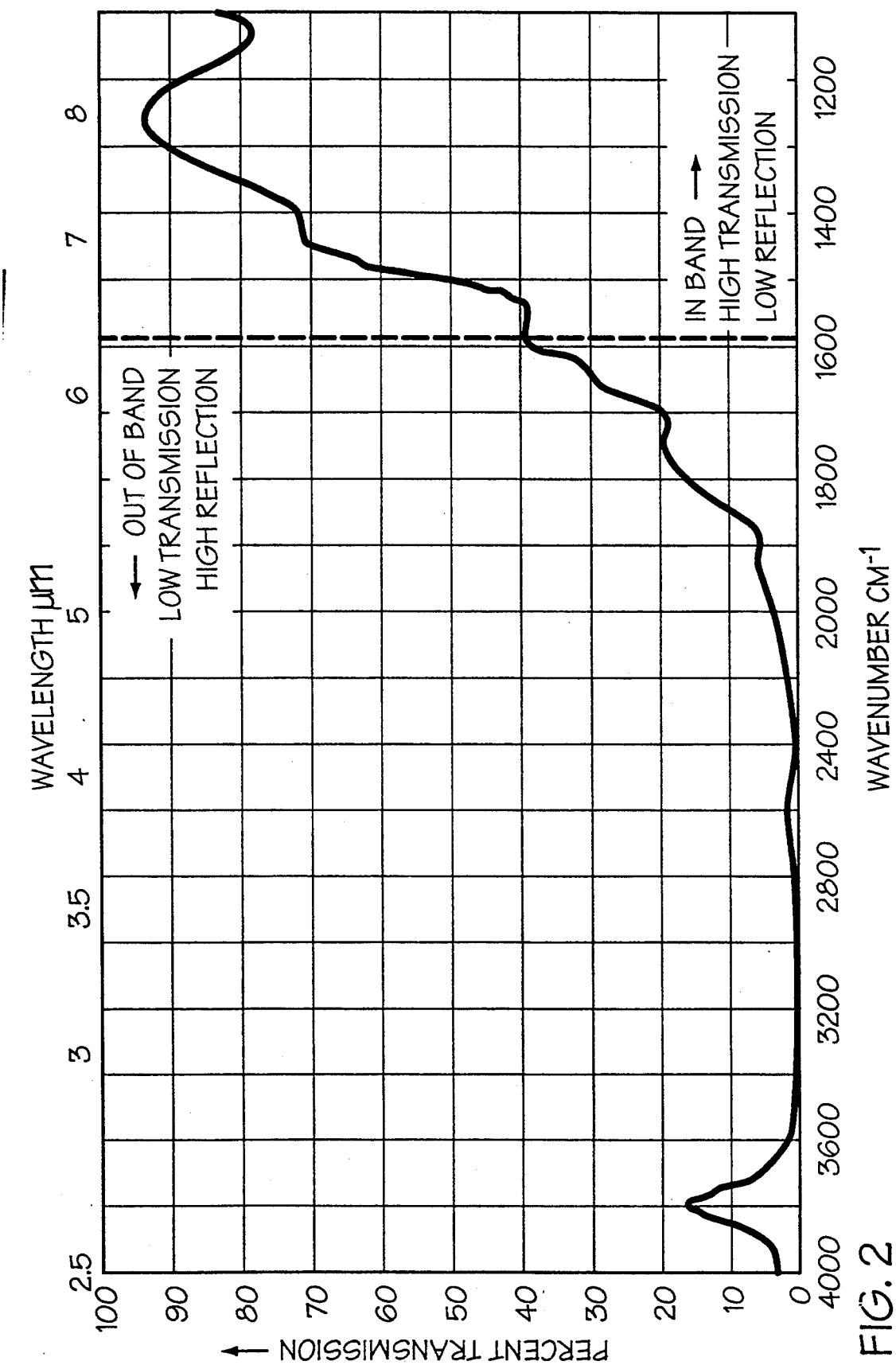
FIG. 2 is a plot of the spectral transmittance of an optical filter used in the apparatus of FIG. 1.

In a preferred embodiment of spectral filter 36, the filter is formed as a multi-layer dielectric coating on rear surface 33 of rear lens 32. FIG. 2 illustrates the measured spectral transmissivity of an example filter used in the embodiment of the present invention shown in FIG. 1. As shown in FIG. 2, example filter 36 has substantially high reflectivity and substantially low transmissivity for out-of-band energy in the wavelength range from about 2.5 microns to 6.1 microns. For wavelengths above 6.1 microns, the transmissivity is greater than 40 percent, while the reflectivity is less and 60 percent. For wavelengths between 7 and 9 microns, the transmissivity is greater than 70 percent, while the reflectivity is less than 30 percent.

In an example implementation of the chromatic radiance attenuator 10 shown in FIG. 1 using a filter 36 having the spectral response shown in FIG. 2, detector array 11 was found to have a 19% reduction in total extraneous photon incidence when lens 32 and filter 36 were installed. Extraneous is here defined as not arising from actual objects or background image upon the detector array. This reduction in extraneous radiation incident upon detector array 11 increases the dynamic range of the infrared sensor system employing the detector, allows longer stare times because the reduced extraneous radiation allows more radiation from the actual scene to be collected before a saturation level is reached, and reduces the shot noise output from the detector array, the latter being proportional to the square root of the absolute number of photons incident upon the detector elements.

The 19 percent improvement in performance of the infrared sensor system, measured as described above, is substantial. It is important to note, however, that the percentage improvement in performance would be expected to be even greater in those situations in which the optics and inside of the sensor are heated, due to aerodynamic or other operational effects. This is because the elements referred to necessarily emit more out-of-band infrared radiation when heated, thereby further reducing system performance below that attained at ambient temperature. Thus, when background radiation from heated elements forward of spectral filter 36 is reflected forward, the percentage reduction in background radiation is increased.

It should also be noted that the spectral filter 36 used to transmit in-band radiation and to reflect out-of-band radiation may be positioned in alternate locations from that shown in FIG. 1. Placement of filter 36 on the "last surface of the last lens," i.e., on the external surface nearest dewar window 15, is preferred. With that placement of the filter, out-of-band radiation from all elements forward of the dewar window is reflected forward. However, in some applications it may not be feasible or desirable to deposit a filter coating on the last surface of the last lens, in which case, filters may be formed on one or more lens surfaces forward of the last surface.

In a modification of the embodiment of the chromatic radiance attenuator shown in FIG. 1, the longitudinal axis of dewar 12 and detector array 11 is tilted slightly with respect to the longitudinal optical axis of optical system 28. The inclination angle between the axes of dewar 12 and optical system 28 can be adjusted to a value such that rays emanating from a specific area of cold finger 16 are reflected back from rear surface 33 of lens 32 and are the only out-of-band rays reaching detector array 11. This specific area may be made as cold as desired. Moreover, the specific area may be specially prepared to have a high emissivity. The high absorptivity and low reflectivity of the high emissivity area prevent radiation emanating from other, warm surfaces from being specularly or diffusely reflected off of the area towards lens 32 and back towards detector array 11. Thus, background radiation reflected back from lens 32 onto detector array 11 may be reduced further from that obtainable in the colinear system of FIG. 1.

Figure 3:
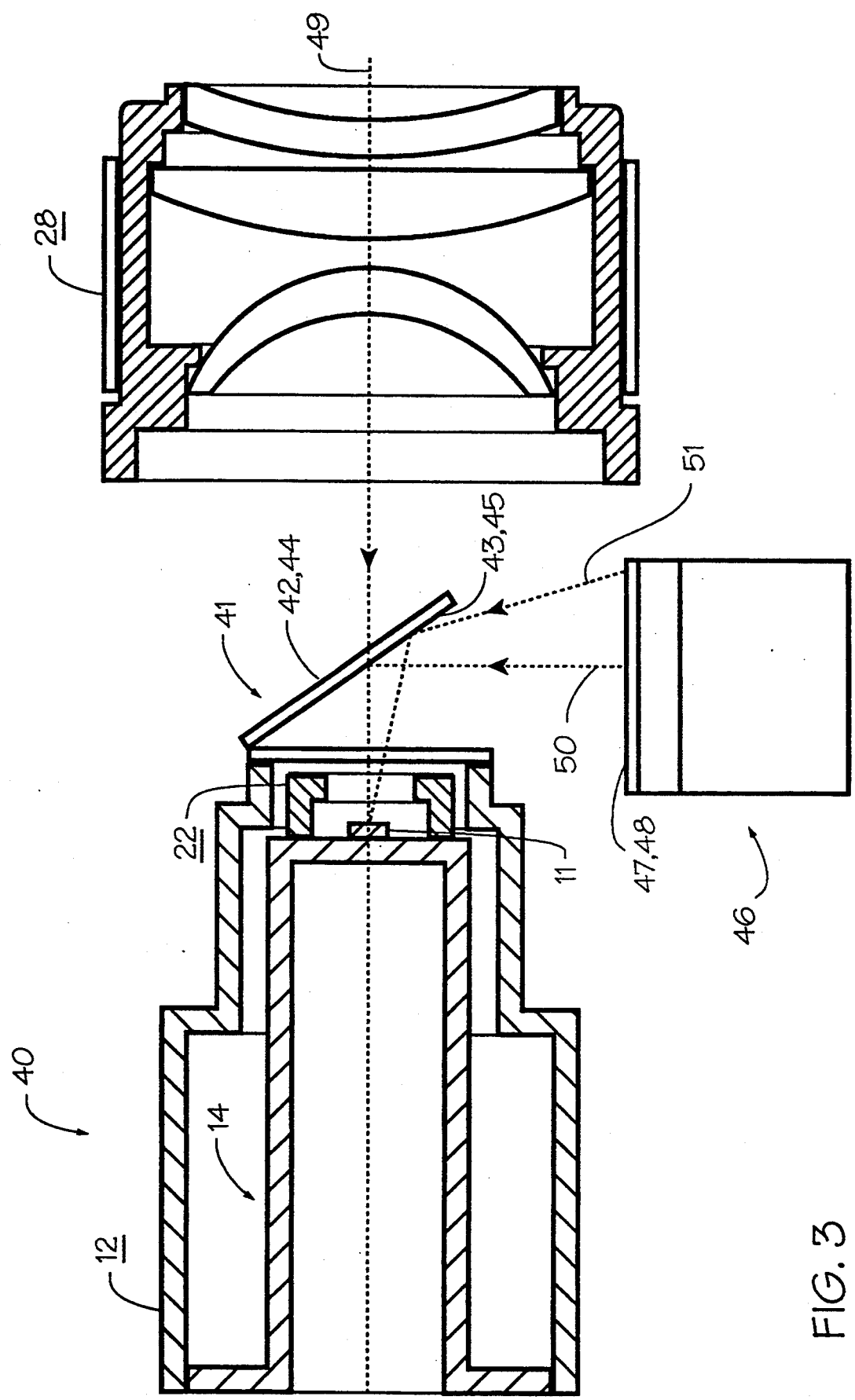
FIG. 3 is a transverse sectional view of another embodiment of a chromatic radiance attenuator according to the present invention.

FIG. 3 illustrates a second embodiment of a chromatic radiance attenuator according to the present invention. The embodiment 40 shown in FIG. 3 includes a detector array 11, dewar 12 and optical system 28, as in the basic embodiment shown in FIG. 1. In addition to those components, second embodiment 40 includes a beam splitter plate 41. Beam splitter plate 41 has a front surface 42 and a parallel rear surface 43, positioned at 45° to the common longitudinal axes of dewar 12 and optical system 27. Preferably, front surface 42 of beam splitter 41 has applied thereto an anti-refection coating 44 which is highly transmissive in a desired range of infrared wavelengths. Also, coating 44 desirably has a high reflectivity for out-of-band wavelengths.

Rear surface 43 of beam splitter plate is preferably provided with an anti-reflective coating 45, similar in characteristics to front coating 44.

As shown in FIG. 3, chromatic radiance attenuator 40 also includes a cooling body. Cooling body 46 has a flat front surface 47 parallel to the longitudinal axes of dewar 12 and optical system 27. Cooling body 46 is positioned relative to beam splitter plate 41 such that the area of rear surface 43 of the beam splitter projected perpendicularly off the longitudinal axes of dewar 12 and optical system 28 falls on surface 47 of cooling body 46. Preferably, front surface 47 of cooling body 46 has thereon a high emissivity coating 48.

Referring still to FIG. 3, a ray 49 of in-band radiation from a scene is shown passing through optical system 28, beam splitter plate 41, and dewar window 15 onto detector array 11. Also shown in FIG. 3 is a typical ray 50 of out-of-band radiation emitted normally from surface 47 of coating body 46, and an oblique ray 51. Rays 50 and 51 may be reflected off rear surface 43 of beam splitter 41 and onto detector array 11. Cooling body 46 is cooled below ambient temperature, by a thermoelectric cooler or a gas cryogenic cooler. The reduced temperature of cooling body 46, in combination with the high emissivity of front surface 47 of the cooling body causes the out-of-band radiant energy incident upon detector array 11, typified by rays 50 and 51, to be of reduced energy and longer wavelength.

What is claimed is:

1. In a radiation detecting apparatus including a detector attached to a mounting surface within a sealed cooled enclosure and an optical system for focusing radiation in a selected wavelength band onto said detector, said enclosure being provided with a flat window transparent to said radiation and joined by a seal to the remainder of said enclosure, the improvement comprising a focusing optical element external to said enclosure and having a concave surface proximate and forward said window, said concave surface having a center of curvature located substantially at said detector whereby stray radiant energy originating between said concave surface and said detector which impinges on said detector is confined substantially to that radiant energy emitted forward from said mounting surface and said detector and reflected rearward onto said detector, and whereby said external optical element may be replaced without having to break said seal.

2. The apparatus of claim 1 wherein said selected wavelength band of radiation is further defined as lying in the infrared portion of the electromagnetic spectrum.

3. The apparatus of claim 1 further including a spectrally selective filter forward of said detector, said filter being substantially transmissive to radiant energy within said selected wavelength band and substantially un-transmissive to radiant energy of other, out-of-band wavelengths.

4. The apparatus of claim 3 wherein said filter is further defined as being substantially reflective to out-of-band radiation, whereby said out-of-band radiation originating forward of said filter is reflected forward, away from said detector.

5. The apparatus of claim 4 wherein said filter is further defined as being an interference filter.

6. The apparatus of claim 5 wherein said interference filter is further defined as including at least one dielectric layer.

7. The apparatus of claim 6 wherein said filter is located on said concave surface of said optical element.

8. The apparatus of claim 7 wherein said selected wavelength band of radiation is further defined as lying in the infrared portion of the electromagnetic spectrum.

9. The apparatus of claim 8 wherein said enclosure is further defined as including means adapted to cool said detector and mounting surface thereof to a temperature below ambient temperature.

10. The apparatus of claim 9 wherein said optical element is further defined as being a lens.

11. The apparatus of claim 9 wherein said mounting surface of said detector adjacent said detector is substantially perpendicular to the optical axis of said focusing optical system.

12. The apparatus of claim 11 wherein a normal to said detector coinciding with the direction of peak sensitivity of said detector is colinear with said optical axis of said focusing optical system.

13. The apparatus of claim 9 wherein a normal to said detector coinciding with direction of peak sensitivity of said detector is tilted at a small angle with respect to the optical axis of said focusing optical system, the magnitude of said small angle being such that an area of said detector mounting surface adjacent said detector is reflectively imaged from said concave rear surface of said lens onto said detector.

14. The apparatus of claim 13 wherein said reflectively imaged mounting surface area is so formed as to have a high black-body emissivity.

15. The apparatus of claim 14 wherein said enclosure is further defined as including means adapted to cool said reflectively imaged area to a temperature below ambient temperature.

16. In an infrared detection system for detecting desired, in-band radiation including a detector and focusing optics for focusing infrared energy onto said detector, an apparatus for attenuating undesired, out-of-band radiation impinging upon said detector, said apparatus comprising;

a. a beam splitter plate having parallel front and rear surfaces interposed between said focusing optics and said detector on a common optical axis thereof, said front and rear surfaces being inclined at an oblique angle to said optical axis, and b. a cooling member located out of the path of the focused infrared energy produced by said focusing optics, said cooling member having a high emissivity surface so located with respect to said rear surface of said beam splitter and said detector as to permit black-body radiation emitted from said surface of said cooling member to be reflected off of said rear surface of said beam splitter onto said detector.

17. The apparatus of claim 16 wherein said oblique angle is further defined as being approximately 45 degrees.

18. The apparatus of claim 16 wherein said front surface of said beam splitter has applied thereto an anti-reflection coating that minimizes reflectivity of said surface to in-band radiation.

19. The apparatus of claim 18 wherein said coating is further defined as having high reflectivity for out-of-band radiation.

20. The apparatus of claim 19 wherein said rear surface of said beam splitter has applied thereto an anti-reflection coating that minimizes reflectivity of said surface to in-band radiation.

* * * * *